Feb. 9, 1965
M. J. OBERT ET AL
3,169,207
ELECTROMAGNETIC DEFLECTION YOKE HAVING INTERCONNECTED MULTIFILAR STRANDS
Filed June 11, 1962
2 Sheets-Sheet 1
FIG. 1.
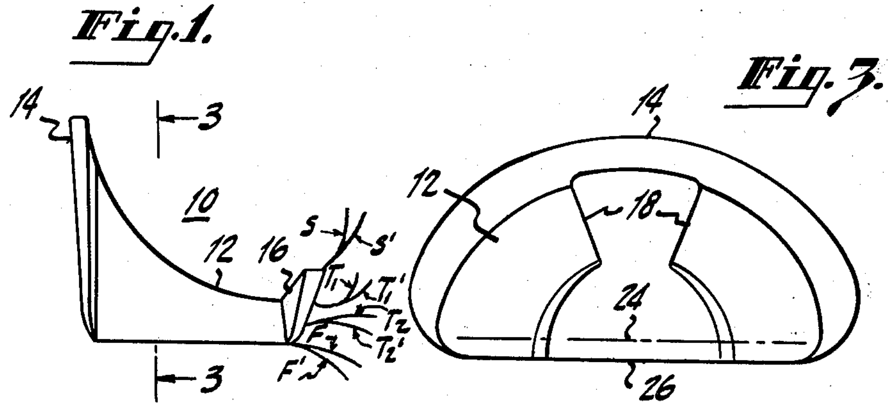
FIG. 1, FIG. 3.
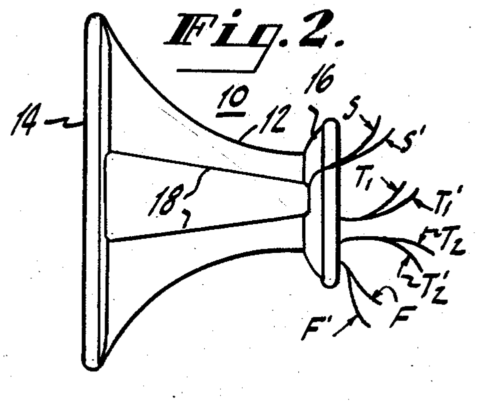
FIG. 2.
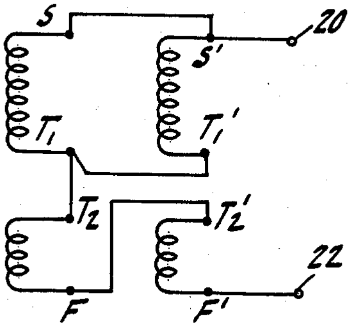
FIG. 4.
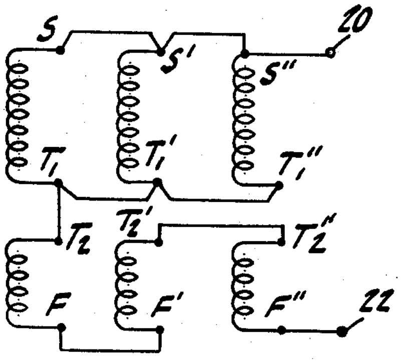
FIG. 7.
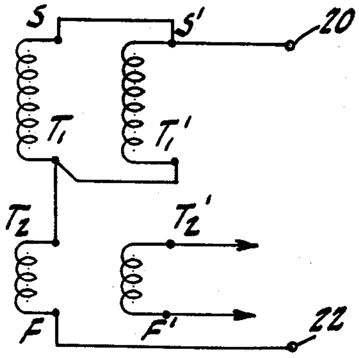
FIG. 6.
INVENTORS,
MAXIMILIAN J. OBERT &
ROBERT L. BARBIN
BY W. H. Spoungle
Attorney Feb. 9, 1965

M. J. OBERT ET AL 3,169,207

ELECTROMAGNETIC DEFLECTION YOKE HAVING INTERCONNECTED MULTIFILAR STRANDS

Filed June 11, 1962

2 Sheets-Sheet 2

INVENTORS
MAXIMILIAN J. OBERT, &
ROBERT L. BARBIN

BY W. H. Spouagle
Attorney 3,169,207

ELECTROMAGNETIC DEFLECTION YOKE HAVING INTERCONNECTED MULTIFILAR STRANDS

Maximilian J. Obert and Robert L. Barbin, Indianapolis, Ind., assignors to Radio Corporation of America, a corporation of Delaware Filed June 11, 1962, Ser. No. 201,535
8 Claims. (Cl. 315—27)

This invention relates to electromagnetic deflection yokes, and more particularly to electromagnetic deflection yokes for the deflection of the electron beam or beams of cathode ray tubes used to reproduce television images in television receivers.

With the advent of wide-angle image reproducing cathode ray tubes in the commercial television receiver field, it has become increasingly difficult to design and manufacture electromagnetic deflection yokes that will properly deflect the electron beam or beams of these tubes to provide a commercially acceptable television raster on their light producing screens. An electromagnetic deflection yoke is normally constructed of two pairs of coil windings. One pair of the windings is used to provide the vertical deflection of the electron beam and the other pair is used to provide the horizontal deflection of the beam. Cathode ray tubes requiring wide angle beam deflection, particularly color television tubes using three electron beams, need relatively exact flux pattern distribution from both the horizontal and vertical windings to properly deflect the electron beam or beams of the tube.

The windings for both horizontal and vertical deflection are generally made to fit around the neck and the flare of the cathode ray tube, and may be in the form of "saddle" windings (see Patent No. 2,901,665, issued August 25, 1959, to W. H. Barkow et al., and entitled Cathode Ray Tube Deflection Yoke). The individual windings are automatically wound to the approximate shape required on a winding machine, impregnated with a thermoplastic bonding material, and cured. The windings are then formed in a mold to the final exact shape in a second machine under heat and pressure, and cooled in the mold so that they will maintain their exact shapes. It is the practice in the art of winding deflection coils bifilar or multifilar, that is two or more wires wound in parallel, in order to obtain a more uniform product under mass production conditions to minimize variations in coil shape due to wire size tolerances. For instance, if the windings are bifilar, two nominal diameter wire strands may be used to wind the coils, or one strand near maximum tolerance and one strand near minimum tolerance may be used.

If it is necessary to slightly modify the flux distribution produced by a winding, the automatic winding machine arbors and forming machine molds must be modified to change the physical configuration of the winding and thus the turns distribution or shape of the resultant winding, which is a time consuming and expensive process. In addition, no large changes in the flux distribution pattern of a winding can be made by merely modifying the machines, but new winding arbors for the winding machines and new molds for the forming machines must be designed and constructed.

Briefly, in accordance with the invention, windings of an electromagnetic deflection yoke for a cathode ray tube are constructed as multifilar windings, that is two or more strands of wires are wound in parallel with a plurality of turns from the start or beginning of the winding to its finish or end. Each strand of wire is not continuous, however, but is made up of a plurality of sections between its start and finish and individual electrical connections can be made to each section. All strands of wire have corresponding sections. One or more of the corresponding sections in each strand of wire are connected in parallel, and one or more of the corresponding sections of each strand of wire are connected in series. In order to produce a readily controllable amount and distribution of magnetic flux produced by the winding, the number of turns in the corresponding sections may be varied as the winding is being wound to vary the ratio between the number of turns connected in series and the number connected in parallel. The effective winding distribution, and hence the flux distribution, of the winding may be slightly modified or drastically altered without changing the physical configuration of the winding, and without changing the arbors or tools used to construct the windings.

The invention may be better understood, however, when the following description is read in connection with the accompanying drawings, in which:

FIGURES 1, 2, and 3 are side, top and sectional views, respectively, of a signal deflection winding of an electromagnetic deflection yoke constructed in accordance with the invention;

FIGURE 4 is a schematic circuit diagram of the single deflection winding of FIGURE 1;

FIGURES 5, 6 and 7 are schematic circuit diagrams of deflection windings illustrating other embodiments of the invention; and FIGURES 8 and 9 are schematic circuit diagrams of pairs of horizontal or vertical deflection windings illustrating yet other embodiments of the invention.

Figures 5, 8, 9:
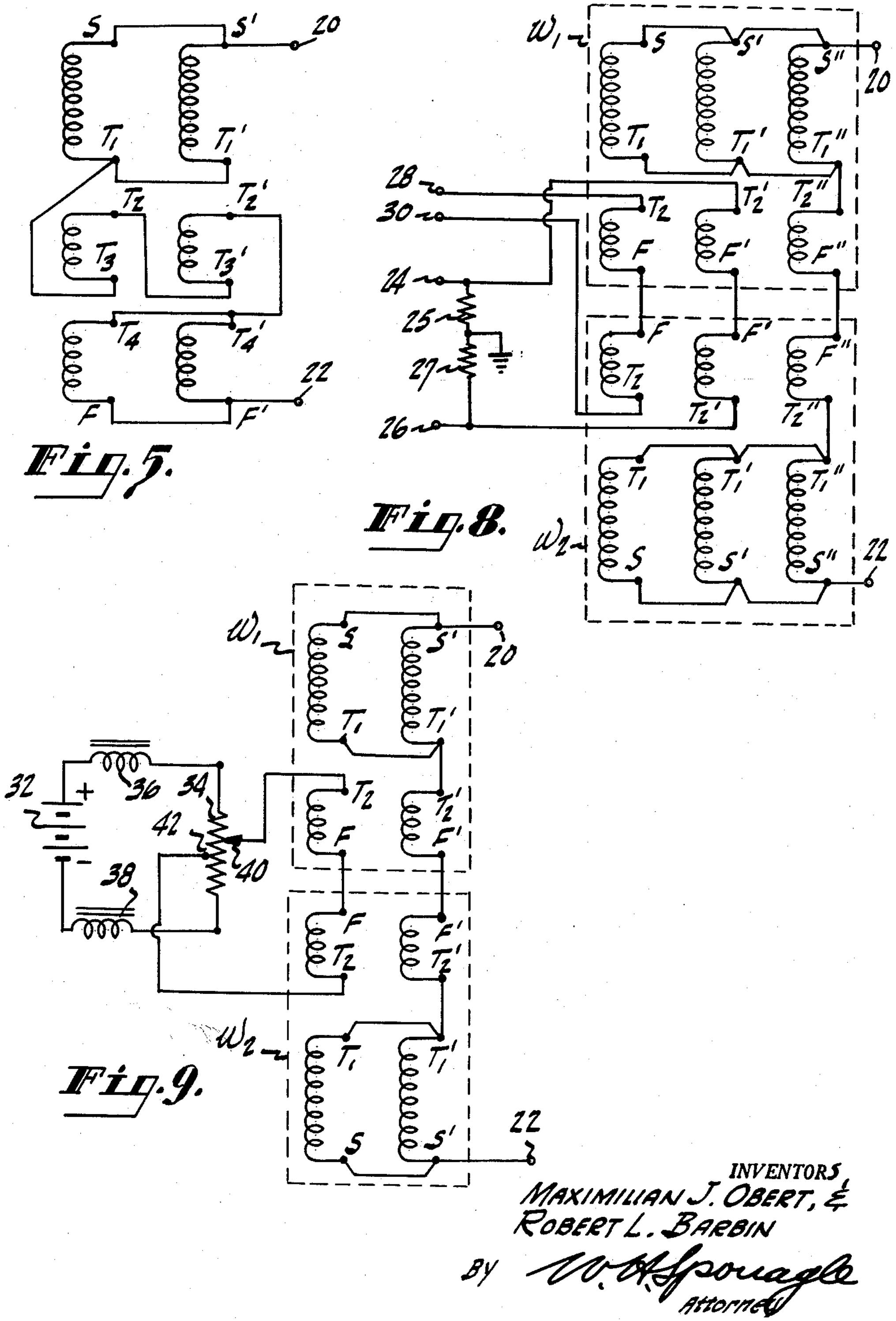

A single yoke deflection winding 10 is illustrated in FIGURES 1, 2 and 3. As is known, four such windings are required in the usual deflection yoke, two for horizontal deflection and two for vertical deflection. The winding 10 includes a central section 12 which contains the active conductors, that is, the conductors that generate the main portion of the flux. The active conductors 12 lie along the surface of the cathode ray tube envelope (not shown), and the inner surface of the active conductors 12 is normally designed to match as closely as possible the outer contour of the envelope of the cathode ray tube. The winding 10 also includes front end turns 14 and rear end turns 16. The front end turns 14 are nearer to the screen of the cathode ray tube than the rear end turns 16 when the winding 10 is in place in a deflection yoke on a cathode ray tube. The end turns 14 and 16 are bent away from the surface of the envelope of the cathode ray tube in order to prevent the current flowing through them from causing undesired modifications of the flux pattern generated by the active conductors 12. A window area or aperture in the coil is defined between inner side walls 18 of the active conductors 12 and the end turns 14 and 16. As is known, the "saddle wound" electromagnetic yoke is constructed by using a pair of windings, such as the winding 10, for horizontal deflection, and a generally similar pair for vertical deflection.

The single coil winding 10 is wound by beginning the wire at the window area, and is called the "start" of the winding. The winding 10 is bifilar wound so that two start wires are used and are labeled S and S'. The "finish" of the winding 10 is at the outside extremity of the active conductors 12 and the wires are labeled F and F'. For convenience in mechanically constructing a yoke, the start and finish wires are drawn out from the end turns.

FIGURE 3 shows a section through the active conductors 12 taken along the line 3—3 in FIGURE 1 and shows that the thickness of the active conductors 12 near the window area at the start of the winding 10 is thinner than at the finish of the winding 10. This thickness variation is one factor determining the flux distribution of the winding 10, and may vary throughout the length of the coil between the end turns 14 and 16. The number of turns in a given area determines the amount of magnetic flux generated in this area.

The winding 10, is constructed so that each of the strands of the bifilar wires are in sections between the start and finish of the winding 10, and taps are drawn out to permit individual electrical connection to each section. These taps are labeled T on the drawings, and the first tap point, in the direction from start (S) to finish (F) is labeled $T_1$, the second labeled $T_2$, the third $T_3$, the fourth $T_4$, and so forth. The wires indicated with primed start and finish letters carry primed letters on the tap points. Only the taps $T_1$, $T_1'$ and $T_2$, $T_2'$ are shown in FIGURES 1 to 4.

It will be appreciated that the manner of changing the flux distribution of a winding known and used in the prior art is to modify the cross-sectional area of the coil section composing the active conductors 12 shown in FIGURES 2 and 3. This requires altering the winding arbors and molding tools. In the embodiments described herein, however, the windings are sectioned so that the effective distribution of the windings may be altered without physically altering the configuration of the winding or the actual physical distribution of the wires.

FIGURE 4 is a schematic circuit diagram of the single horizontal or vertical coil yoke winding 10, as shown in FIGURES 1, 2 and 3. One of the wire strands of the bifilar winding begins at S and finishes at F, and the second strand begins at S′ and finishes at F′. The S–F strand is broken at a tap point between start and finish to provide two sections S–$T_1$ and $T_2$–F. The S′–F′ portion of the winding is likewise broken to also provide two sections S′–$T_1$, and $T_2'$–F′, corresponding respectively, to the S–$T_1$ and $T_2$–F sections. The starts of the winding, S and S′, are connected directly together and the first tap points $T_1$ and $T_1'$ are connected directly together. Therefore, the two sections S–$T_1$ and S′–$T_1'$ are connected in parallel. The tap points $T_1$ and $T_1'$ are connected directly to tap point $T_2$ of the S–F winding, and finish F of the S–F winding is connected directly to $T_2'$ of the S′–F′ winding, connecting the $T_2$–F, and $T_2'$–F′ sections in series. Thus, the sections S–$T_1$ and S′–$T_1'$ are connected in parallel with themselves and in series with the sections $T_2$–F and $T_2'$–F′. The starts S and S′ are connected to a first deflection current input terminal 20, and the finish F′ is connected to a second deflection current input terminal 22.

Deflection current, which may be derived from a source of deflection current in a television receiver, is applied to the input terminals 20 and 22. Assuming that the deflection current flows from terminal 20 to terminal 22, it will divide between the parallel connected sections S–$T_1$ and S′–$T_1'$ of the winding 10, but the whole deflection current will flow through both of the sections $T_2$–F and $T_2'$–F′, rather than dividing. Note that the current flows in the same direction in the series connected between $T_2$–F and $T_2'$–F′ as in the parallel connected sections S–$T_1$ and S′–$T_1'$, so that the flux generated in all sections is in the same direction or, as more simply stated, is "aiding." This generates twice as much flux in the $T_2$–F and $T_2'$–F′ sections as would be generated if the sections $T_2$–F and $T_2'$–F′ were connected in parallel. Thus, the effective turns distribution from the tap to the finish of the winding 10 has been doubled without modifying the physical configuration of the winding 10. The area of the winding 10 in which the effective turns distribution has been increased is shown in FIGURE 3, between the broken lines 24 and 26. A similar increase in turns distribution occurs in the end turn sections 14 and 16.

The winding 10 may be connected so that the sections S–$T_1$, and S′–$T_1'$ are in series and the sections $T_2$–F and $T_2'$–F′ are in parallel, thus increasing the effective flux distribution from start to tap, instead of from tap to finish as shown in FIGURE 4.

One manner in which a winding constructed in accordance with the invention may be effectively used is in the mass production of electromagnetic deflection yokes for color or black and white television receivers. As an example, assume that the individual windings of an electromagnetic deflection coil are designed to have a bifilar winding of 265 turns from start to finish with tap points at 5 turns from the finish. The tap points are to be connected as shown in FIGURE 4 with the sections from tap to finish connected in series giving a winding of 260 turns in parallel and 10 turns in series at the finish. A plurality of sets of winding arbors or winding and forming combination tools are used to manufacture these windings. If it is found that all tools produce windings that yield electromagnetic deflection yokes having the proper flux distribution patterns, no further modification need be made in the windings. However, if one or more sets of tools produce windings that do not generate enough flux in the region between the tap and finish of the windings, the tap can be drawn out at 6 turns instead of 5 turns. The resultant winding produced from this tool will thus have 259 windings turns connected in parallel and 12 turns connected in series at the finish of the winding. The resultant winding will thus have increased flux producing capability in the tap to finish section of the winding. If, however, it is found that the normal 5 turn tap in the windings produced by one or more of the sets of tools produces too great a flux in the tap to finish area, the tap may be drawn out at 4 turns from the finish instead of 5, giving a winding with 261 turns in parallel, and 8 turns in series from tap to finish, thus reducing the amount of flux generated from tap to finish.

By means of this technique all of the windings made on the plurality of sets of tools may be made to yield substantially uniform electromagnetic yokes without modifying or altering the winding and forming tools themselves.

The use of wire on the minimum side of the nominal commercial tolerance on diameter causes the turns distribution to shift toward the window area. By increasing the turns from tap to finish, this effect can be balanced out. Alternatively, wire on the maximum side of the nominal diameter may be used to wind the coil by reducing the turns from tap to finish, and the required flux pattern for good performance can be maintained.

The series connected portions shown from tap to finish in FIGURE 4 may be inserted at any location throughout the winding, for example, in the center of one of the windings rather than at the start or finish, by drawing out two sets of taps as shown in FIGURE 5. The winding thus has three sections in each strand. In the S–F strand, the sections are S–$T_1$, $T_2$–$T_3$ and $T_4$–F; and in the S′–F′ strand the sections are S′–$T_1'$, $T_2'$–$T_3'$ and $T_4'$–F′. The S–$T_1$ and S′–$T_1'$ sections and the $T_4$–F and $T_4'$–F′ sections are connected in parallel. The first current input terminal 20 is connected to starts S and S′, and the second terminal 22 to the finishes F and F′. However, $T_1$ is connected to $T_3$, $T_2$ is connected to $T_3'$, and $T_2'$ is connected to $T_4$ and $T_4'$, thus connecting the two central sections of the winding in series. Note that current through these central sections is flowing in an opposite direction to the current through the two sets of end sections. This connection serves to generate an electromagnetic "hole" in the flux pattern developed by the winding, in that the flux generated in the central sections is opposite, or "bucking," that generated in the rest of the winding.

The central sections $T_2$–$T_3$ and $T_2'$–$T_3'$ of FIGURE 5 could be connected in series "aiding" relationship, that is, tap point $T_1$ connected to $T_2$, $T_3$ to $T_2'$, and $T_3'$ to both $T_4$ and $T_4'$, to increase the flux produced by the central sections.

The inductance-to-resistance ratio of a winding may be altered without altering the inductance of the winding. This type of connection is shown in the schematic diagram of FIGURE 6, which is a single horizontal or vertical bifilar yoke coil winding in which each strand consists of two sections. The S–$T_1$ section in one strand is connected in parallel with the $S'-T_1'$ section in the other strand, with the starts S and S' connected to the first input terminal 20. The tap points $T_1$ and $T_1'$ are connected to $T_2$ and the finish F is connected to the second input terminal 22. The $T_2'-F'$ section is left unconnected. The resistance of the $T_2-F$ section of the winding is double that of the resistance that would have been present from tap to finish if the $T_2-F$ and $T_2'-F'$ sections had been connected in parallel. The inductance of the winding has not been changed, however, because the effective number of turns from tap to finish is the same whether the $T_2'-F'$ section is unconnected or connected in parallel with $T_2-F$.

The inductance-to-resistance ratio may also be changed by making each coil winding trifilar, as shown in FIGURE 7. The sections $S-T_1$, $S'-T_1'$ and $S''-T_1''$ are connected in parallel, with the starts S, S', and S'' connected to the first input terminal 20. The section $T_2-F$ is connected in series with the three start to tap sections so that the generation of flux therein aids that generated in the start to tap sections. The section $T_2'-F'$ is connected in series to "buck," or subtract flux, and section $T_2''-F''$ is connected to "aid," or add flux. Specifically, tap point $T_2$ is directly connected to taps $T_1$, $T_1'$ and $T_1''$; the finish F is connected to finish F'; the tap point $T_2'$ is connected to tap $T_2''$; and the finish F'' is connected to the second current input terminal 22. The flux generated in $T_2''-F''$ is cancelled by that generated by the $F'-T_2'$ section. The only flux thus contributed from tap to finish is that in $T_2-F$, which is the same flux as if all three tap to finish sections were connected in parallel aiding. However, the resistance from tap to finish has been increased nine times because the resistance of the three tap to finish portions $T_2-F$, $T_2'-F'$, and $T_2''-F''$ are in series rather than in parallel.

Windings may also be arranged for use in generating horizontal or vertical deflection frequency auxiliary pulses for use in a television receiver. These pulses are free from the high voltage B-Boost normally obtained when the horizontal deflection output transformer of a television receiver is tapped to supply auxiliary pulses. They may be desired for operation, for example, of tubes or transistorized electron beam convergence circuits for the color image reproducing cathode ray tubes in color television receivers, automatic frequency control circuits of horizontal deflection oscillators, automatic gain control circuits, or for horizontal or vertical blanking circuits, as is known in the art.

One method of auxiliary pulse generation is shown in the schematic diagram of FIGURE 8 in which $W_1$ and $W_2$ are two separate trifilar windings, which together form a complete set of horizontal or vertical windings of a yoke, with each strand of each winding having two sections. In each of the windings $W_1$ and $W_2$, the sections $S-T_1$, $S'-T_1'$ and $S''-T_1''$ are connected in parallel aiding and the tap point $T_2''$ is connected to the junction of the tap points $T_1$, $T_1'$ and $T_1''$ to provide a series aiding connection with section $T_2''-F''$. The finish F'' of the winding $W_1$ is connected directly to the finish F'' of $W_2$. Deflection current is applied through the first terminal 20 to S, S' and S'' of $W_1$, and through the second terminal 22 to S, S' and S'' of $W_2$. The inductance of both of the windings $W_1$ and $W_2$ is determined by the total number of turns in each of the windings, and is the same as if all tap to finish portions of these windings had been connected in parallel. The resistance from tap to finish of each of the windings $W_1$ and $W_2$ is, however, larger than it would have been had all tap to finish sections of the windings been connected in parallel.

The finish F' of $W_1$ is connected directly to the finish F' of $W_2$ and a utility pulse is taken from first output terminals 24 and 26 which are connected to tap point $T_2'$ of $W_1$ and tap point $T_2'$ of $W_2$, respectively. Finish F of $W_1$ is also connected to finish F of $W_2$ and a second utility pulse is taken from second output terminals 28 and 30 which are connected to tap point $T_2$ of $W_1$ and tap point $T_2$ of $W_2$, respectively. These pulses are generated across the deflection windings, and inductively coupled to the pulse output terminals, by rapid changes in deflection current through the windings $W_1$ and $W_2$. This type of connection may be used where it is more costly or impractical to obtain the auxiliary pulses required in a television receiver from the horizontal or vertical output transformer, as is often present practice in the art.

Opposite polarity pulses may also be obtained by connecting a pair of resistors 25 and 27 in series between the first output terminals 24 and 26, and grounding the junction of the resistors 25, 27. Opposite polarity pulses are available between ground and the first output terminals 24, 26.

Sections of winding may be constructed to provide a direct current, electrical centering circuit for a television receiver, without requiring that direct centering current flow through the deflection windings themselves. In FIGURE 9, a pair of bifilar windings $W_1$ and $W_2$, for horizontal or vertical yoke coils, is shown. Each strand of each winding has two sections, as illustrated.

In both windings, $W_1$ and $W_2$, the $S-T_1$ and $S'-T_1'$ sections are connected in parallel aiding, and $T_2'$ is connected to the junction of tap points $T_1$ and $T_1'$. The finish F' of $W_1$ is connected to the finish F' of $W_2$. Deflection current is applied through the first input terminal 20 to the junction of S and S' of $W_1$, and through the second input terminal 22 to the junction of S and S' of $W_2$. Parallel connected sections $S-T_1$ and $S'-T_1'$ of $W_1$ are connected in series aiding with section $T_2'-F'$ of $W_1$, which is connected in series with section $F'-T_2'$ of $W_2$, which in turn is connected in series aiding with the parallel connection of sections $T_1-S$ and $T_1'-S'$ of $W_2$. These sections of the windings $W_1$ and $W_2$ in series connection serve to generate the electron beam deflecting flux.

A source of direct centering voltage, which is illustrated as battery 32, has its positive terminal connected to one end of a center tapped potentiometer 34 and its negative terminal connected to the other end of the potentiometer 34, through suitable decoupling chokes 36 and 38, which may be desirable when the windings $W_1$ and $W_2$ form a horizontal deflection yoke. The variable arm 40 of the potentiometer 34 is connected to tap $T_2$ of $W_1$. The finish F of $W_1$ is connected to the finish F of $W_2$ and the tap $T_2$ of $W_2$ is connected to the center tap 42 of the potentiometer 34. Thus, displacement of the variable arm 40 of the potentiometer 34 from its center position causes tap $T_2$ of coil $W_1$ to become positive or negative in voltage with respect to tap $T_2$ of coil $W_2$, depending on the direction of the displacement of the arm of the potentiometer 34. The displacement of the variable arm of the potentiometer 34 controls the magnitude and direction of the direct current through the series connected sections $T_2-F$ of $W_1$ and $F-T_2$ of $W_2$ and thus the direct flux generated by these windings. This serves as an electron beam centering control for a cathode ray tube.

An electromagnetic deflection yoke in a television receiver having windings in accordance with this invention, may be utilized in many ways to provide not only various auxiliary pulse voltages and functions required in a television receiver, but also to provide means for changing its effective winding distribution, and hence its flux distribution, without modifying the actual position of the winding wires in the winding.

What is claimed is:

1. In an electromagnetic deflection yoke for a cathode ray tube, said yoke having a plurality of windings at least one of which comprises in combination:
   a plurality of strands of wire multifilar wound in a plurality of winding turns, each strand of said one winding having a plurality of sections between the ends thereof to which independent electrical connections may be made, the sections of one strand having corresponding identical sections in all other strands;

means for connecting a first set of corresponding sections of said strands in parallel;
a pair of deflection current input terminals for said one winding; and
means for connecting said first set of corresponding parallel connected sections in series with another section of said one winding between said pair of deflection current input terminals to control the amount and distribution of the magnetic flux produced by said one winding.

2. In a multiwinding electromagnetic deflection yoke for a cathode ray tube, a winding for said yoke comprising in combination:
a plurality of strands of wire multifilar wound in a plurality of winding turns, each having a plurality of sections between the ends thereof to which independent electrical connections may be made, each of said strands having corresponding identical sections;
means for connecting a first one of the sections in one strand in parallel with its corresponding sections in each of the other strands to form a first set of sections;
a pair of deflection current input terminals for said winding; and
means for connecting said first set of sections in series with at least one of the remaining sections of said winding between said pair of deflection current input terminals to control the amount and distribution of the magnetic flux produced by said winding.

3. In an electromagnetic deflection yoke for a cathode ray tube, said yoke having a plurality of windings at least one of which comprises in combination:
a pair of strands of wire bifilar wound in a plurality of winding turns, each strand of said one winding having two sections between the ends thereof to which independent electrical connections may be made, each of said strands having corresponding identical sections;
means for connecting one pair of corresponding sections of said strands in parallel;
means for connecting the other pair of corresponding sections of said strands in series;
a pair of deflection current input terminals for said one winding; and
means for connecting said one pair of sections in series with said another pair of sections between said pair of deflection current input terminals to control the amount and distribution of the magnetic flux produced by said one winding.

4. In an electromagnetic deflection yoke for a cathode ray tube, said yoke having a plurality of windings each one of at least two of which comprises in combination:
a plurality of strands of wire multifilar wound in a plurality of winding turns, each strand of each one of said two windings having a plurality of sections between the ends thereof to which independent electrical connections may be made, the sections of one strand having corresponding identical sections in all other strands;
means for connecting a first one of the sections in one strand in parallel with its corresponding sections in each of the other strands to form a first set of sections;
a pair of deflection current input terminals for each one of said two windings; and
means for connecting said first set of sections in series with at least one of the remaining sections of each one of said two windings between said pair of deflection current input terminals, so that the current in said first set of sections produces a magnetic flux in the same direction as the magnetic flux produced by said one of the remaining sections.

5. In an electromagnetic deflection yoke for a cathode ray tube, said yoke having a plurality of windings each one of at least two of which comprises in combination:
a plurality of strands of wire multifilar wound in a plurality of winding turns, each strand of each one of said two windings having a plurality of sections between the ends thereof to which independent electrical connections may be made, the sections of one strand having corresponding identical sections in all other strands;
means for connecting a first one of the sections in one strand in parallel with its corresponding sections in each of the other strands to form a first set of sections;
a pair of deflection current input terminals for each one of said two windings; and
means for connecting said first set of sections in series with at least one of the remaining sections of each one of said two windings between said pair of deflection current input terminals, so that the current in said first set of sections produces a magnetix flux in the opposite direction to the magnetic flux produced by said one of the remaining sections.

6. In an electromagnetic deflection yoke for a cathode ray tube, said yoke having at least four windings each one of at least two of which comprises in combination:
a plurality of strands of wire multifilar wound in a plurality of winding turns, each strand of each one of said two windings having a plurality of sections between the ends thereof to which independent electrical connections may be made, the sections of one strand having corresponding identical sections in all other strands;
means for connecting a first set of corresponding sections of said strands in parallel;
a pair of deflection current input terminals for each one of said two windings; and
means for connecting said first set of corresponding sections in series with another section of each one of said two windings between said pair of deflection current input terminals, such that flux produced by said first set of corresponding sections is in the same direction as that produced by the other section.

7. In a multiwinding electromagnetic deflection yoke for a cathode ray tube, a winding for said yoke comprising in combination:
a plurality of strands of wire multifilar wound in a plurality of winding turns, each of said strands having a plurality of sections between the ends thereof to which independent electrical connections may be made, the sections of one strand having corresponding identical sections in all other strands;
means for connecting a first set of corresponding sections of said strands in parallel;
a pair of deflection current input terminals for said winding;
means for connecting said first set of corresponding sections in series with at least one of the remaining sections of said winding between said pair of deflection current input terminals to control the amount and distribution of the magnetic flux produced by said winding; and
means for deriving an output pulse signal from another of the remaining sections of said winding in response to deflection current applied to said pair of deflection current input terminals.

8. In an electromagnetic deflection yoke for a cathode ray tube, said yoke having at least four windings each one of which comprises in combination:
a plurality of strands of wire multifilar wound in a plurality of sections between the ends thereof to which independent electrical connections may be made, the sections of one strand having corresponding identical sections in all other strands;
means for connecting a first one of the sections in one strand in parallel with its corresponding sections in each of the other strands to form a set of sections;

a pair of deflection current input terminals for each one of said windings;

means for connecting said set of sections in series with another section of each one of said windings between said pair of deflection current input terminals to control the amount and distribution of the magnetic flux produced by each one of said windings; and means for applying a controllable direct current through a further section of said winding as an electrical centering control for said yoke.

References Cited by the Examiner

UNITED STATES PATENTS

| | | | |
|---|---|---|---|
| 2,098,390 | 11/37 | Iams | 315—27 X |
| 2,799,798 | 7/57 | Kratz et al. | 315—27 |
| 2,902,540 | 9/59 | Sarson | 178—6.8 |

DAVID G. REDINBAUGH, *Primary Examiner.*

ROBERT SEGAL, *Examiner.*